United States Patent Office 3,591,691
Patented July 6, 1971

3,591,691
COMPOSITIONS AND METHODS FOR TREATMENT
OF SPASTIC CONDITIONS
Charles Gansser, Essonne, France, and Walter Schindler, Riehen, Switzerland, assignors to Geigy Chemical Corporation, Ardsley, N.Y.
No Drawing. Division of application Ser. No. 647,228, June 19, 1967, now Patent No. 3,505,314, dated Apr. 7, 1970, which is a continuation-in-part of application Ser. No. 235,177, Oct. 30, 1962, which in turn is a continuation-in-part of application Ser. No. 52,044, Aug. 26, 1960. This application Mar. 4, 1968, Ser. No. 735,934
Claims priority, application Switzerland, Aug. 28, 1959, 77,491/59; Jan. 13, 1960, 299/60; Feb. 25, 1960, 2,190/60
Int. Cl. A61u 17/00
U.S. Cl. 424—244
4 Claims

ABSTRACT OF THE DISCLOSURE 5-(n-butyl)-iminodibenzyls which are substituted in γ-position at the n-butyl substituent by a dimethylamino or diethylamino radical as well as pharmaceutically acceptable salts thereof with inorganic and organic acids, which compounds have strong spasmolytic and especially musculotropic action rendering then useful in the treatment of psychosomatic disturbances, especially spastic conditions of smooth muscle structures of the gastro-intestinal, urogenital and biliary tracts and/or the bronchial system while being practically free from antidepressant action on the central nervous system whereby these compounds are distinguished from well-known antidepressant iminodibenzyl derivatives; spasmolytic compositions containing the aforesaid compounds; and a method for the treatment of spastic conditions of smooth muscle structures in mammals with the aid of the aforesaid compounds.

This application is a divisional application of Ser. No. 647,228, filed June 19, 1967, now U.S. Pat. No. 3,505,314, which is a continuation-in-part of our copending application Ser. No. 235,177 (now abandoned), filed Oct. 30, 1962 as a continuation-in-part of our application Ser. No. 52,044, filed Aug. 26, 1960, now abandoned.

The present invention concerns new N-heterocyclic compounds having valuable pharmacological properties.

Compounds having the general formulae

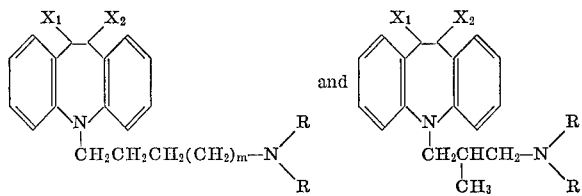

wherein
each of $X_1$ and $X_2$ represents hydrogen, or $X_1$ and $X_2$ taken together represents a direct bond,
R is lower alkyl, and
m is zero or one, are primarily distinguished by sizeable reserping-antagonistic activity which is generally correlated with antidepressant activity. These compounds are, therefore, valuable in the the treatment of mental disorders, particularly depressions. However, these compounds do not possess significant spasmolytic and especially musculotropic activity, whereas such activity is desirable in the treatment of certain types of mental depression, which do not involve a central component of agitation; for antidepressants of the aforesaid type commonly cause an aggravation of agitation even though the depressed state is ameliorated.

It has now been found that the compounds of the formula

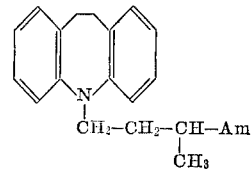

(I)

wherein Am represents dimethylamino, diethylamino or pyrrolidino, as well as 5-(γ-pyrrolidino-n-butyl)-iminostilbene, and their pharmaceutically acceptable addition salts with acids, are distinguished from the above-mentioned prior art compounds and from 5-(γ-diethylamino-n-butyl)-iminostilbene by strong spasmolytic and especially musculotropic action which makes these compounds particularly useful in the treatment of psychosomatic disturbances, i.e. disturbances which noticeably affect the mental as well as the somatic domain simultaneously.

In contrast to the prior art compounds, the reserpine-antagonistic activity of the compounds of Formula I is without significance as far as antidepressive action is concerned. This renders these compounds particularly useful for the treatment of somatic conditions such as, especially, spastic conditions of smooth muscle structures of the gastro-intestinal, urogenital and biliary tracts, and/or the bronchial system, in those cases where the treatment of such afflictions would be adversely affected by central nervous stimulation. Indeed, the aforesaid somatic effects are important symptom-causing factors in a wide variety of diseases, many of which may have a central component of agitation, aggravation of which is very undesirable.

The substantial elimination of the central stimulant activity with concommitant increase in the anticholinergic and musculotropic activities as achieved in the compounds of the instant invention, is completely unexpected and is particularly advantageous because these compounds do thus have no agitation-aggravating effects as are found in known antidepressives.

The new compounds, preferably in the form of pharmaceutical compositions containing them as active ingredients, can be applied orally or parenterally, and preferably in daily dosages ranging from 0.5 to 15 mg. per kg. of adult mammal.

The compounds of the above Formula I can be produced by reacting iminodibenzyl of the formula

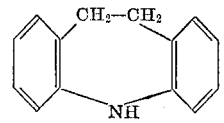

(II)

in the presence of a condensing agent with a reactive ester of a basic alcohol of the formula

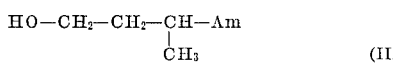

wherein Am has the meaning given above.

5-(γ-pyrrolidino-n-butyl)-iminostilbene is produced by reacting iminostilbene with a reactive ester of γ-pyrrolidino-n-butanol, under otherwise similar conditions as are used in the production of compounds of Formula I.

Particularly suitable condensing agents are sodium amide, lithium amide, potassium amide, sodium or potassium, butyl lithium, phenyl lithium, sodium hydride or lithium hydride. The reaction can be performed in the presence or absence of an inert organic solvent, of which examples are benzene, toluene and xylene.

As reactive esters of the aforesaid basic alcohol, in particular the halides, aryl sulphonic acid esters and methane sulphonic acid esters are used. Examples thereof are γ-dimethylamino-n-butyl chloride and the corresponding bromide, and γ-toluene sulphonic acid ester. These reactive esters of the basic alcohol are obtained, for example, starting from 1,3-butylene glycol by reacting it with acetyl chloride to form 3-chloro-n-butyl acetate, reacting the latter with dimethylamine and converting the resulting 3-dimethyl-amino-n-butanol obtained into its chloride, bromide or toluene sulphonic acid ester.

The compounds according to the invention form pharmaceutically acceptable addition salts, some of which are water-soluble, with inorganic or organic acids such as hydrochloric acid, hydrobromic acid, sulphuric acid, phosphoric acid, methane sulphonic acid, ethane disulphonic acid, acetic acid, citric acid, malic acid, succinic acid, maleic acid, fumaric acid, tartaric acid, benzoic acid, phthalic acid and 8-chlorotheophyllin.

The following non-limitative examples further illustrate the production of the new compounds according to the invention. Where not otherwise stated, parts are given as parts by weight and their relationship to parts by volume is as that of grams to cubic centimeters. The temperatures are in degrees centigrade.

EXAMPLE 1

9.7 parts of iminodibenzyl are dissolved in 50 parts by volume of anhydrous benzene. A suspension of 2.2 parts of sodium amide in toluene is added dropwise at 60° while stirring strongly, whereupon the sodium compound of the iminodibenzyl precipitates.

The benzene solution of the base from 10.3 parts of γ-dimethylamino-n-butyl chloride-hydrochloride (M.P. 182°) in 150 parts by volume of anhydrous benzene is added dropwise while stirring strongly at 60° and the reaction mixture is kept for 2 hours at this temperature. The whole is then refluxed for 12 hours. Water is then added to the reaction mixture and the basic portions are removed from the benzene phase by extracting three times with dilute hydrochloric acid. The combined extracts are made alkaline and ethered out, the ethereal solution is dried over potassium carbonate and concentrated. The residue is distilled in a high vacuum whereupon the 5-(γ-dimethylamino-n-butyl)-iminodibenzyl passes over at 165° under 0.02 mm. pressure.

The hydrochloride prepared with alcoholic hydrochloric acid melts at 146–148° (from acetone).

On using γ-diethylamino-n-butyl chloride (B.P.$_{11}$ 63°), 5-(γ-diethylamino - n - butyl) - iminodibenzyl (B.P.$_{0.02}$ 196–200°) is obtained in an analogous manner. Its hydrochloride prepared with alcoholic hydrochloric acid melts at 165–166°.

On using γ-pyrrolidyl-n-butyl chloride, 5-(γ-pyrollidyl-n-butyl)-iminodibenzyl is obtained in an analogous manner.

To produce dosage units for peroral application, the above-mentioned active compounds or the salts thereof are combined, e.g. with solid, puverulent carriers such as talcum, lactose, saccharose, sorbitol, mannite; starches such as potato starch, corn starch or amylopectin; cellulose derivatives or gelatine, possibly with the addition of lubricants such as magnesium or calcium stearate or polyethylene oxides of suitable molecular weight (Carbowax) and disintegrating agents such as, e.g. alginic acid, laminaria powder or citrus pulp powder, to form tablets or dragée cores. The latter are coated, for example, with concentrated sugar solutions which can contain for example, shellack, gum arabic, talcum and/or titanium dioxide, or with Carbowax with the addition of talcum or titanium dioxide. Dyestuffs are added to the dragées, e.g. to distinguish between the different dosages. Soft gelatine capsules (pearl-shaped closed capsules) and other closed capsules consist, for example, of gelatine and contain, e.g. mixtures of the active ingredient or its suitable salts with Carbowax, and hard gelatine capsules contain, e.g. granulates of the active substance or its suitable salts with gelatine, magnesium stearate or stearic acid.

Suppositories are an example of dosage units for rectal application. They consist of a combination of the active substance or of a suitable salt with a neutral fatty base.

Ampoules for parenteral, particularly intramuscular application preferably contain a water soluble salt of the active substance according to the invention and suitable stabilizing agents and, optionally, buffer substances in aqueous solution.

Antioxidising agents such as sodium bisulphite, sodium sulphite, ascorbic acid or rongalite (formaldehyde-sodium bisulphite compound) are suitable in particular as stabilising agents either alone or combined, in total concentrations between about 0.1–0.5 per mil. Because of its ability to form chelates, ascorbic acid has an additional stabilising effect; in this function it can also be replaced by other chelate-formers. The best stability of the active ingredient is attained if the pH of the ampoule solutions is between 3.5 and 5. This range can be attained, e.g. by mixtures in suitable ratio of sodium sulphite sodium bisulphite and/or ascorbic acid, or by the addition of other buffer substances such as citric acid and/or salts thereof. In addition, the ampoules can contain a slight amount of a usual conserving agent.

The following examples illustrate the production of two typical forms of application for oral and one for parenteral use, but the invention is in no way limited thereto.

EXAMPLE 2

250 g. of 5-(γ-dimethylamino-n-butyl)-iminodibenzyl hydrochloride are mixed with 175.80 g. of lactose and 169.70 parts of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. colloidal silicon dioxide are mixed in and the mixture is pressed into 10,000 tablets each weighing 100 mg. and containing 25 mg. of active substance (hydrochloride).

The tablets can be marked with break lines if desired to enable a closer adaptation of the dosage to be made.

EXAMPLE 3

A granulate is prepared from 250 g. of 5-(γ-diethylamino-n-butyl)-iminodibenzyl hydrochloride, 175.90 g. of lactose and the alcoholic solution of 10 g. of stearic acid. After drying, the granulate is mixed with 56.60 g. of colloidal silicon dioxide, 165 g. of talcum, 20 g. of potato starch and 2.50 g. of magnesium stearate and pressed in 10,000 dragée centres. These are then coated with a concentrated syrup of 502.28 g. of crystallised saccharose, 6 g. of shellack, 10 g. of gum arabic, 0.22 g. of dyestuff and 1.5 g. of titanium dioxide and dried. The dragées obtained each weigh 120 mg. and contain 25 mg. of active substance.

EXAMPLE 4

1.25 g. of 5-(γ-dimethylamino-n-butyl)-iminodibenzyl hydrochloride, 0.10 g. of ascorbic acid, 0.05 g. of sodium bisulphite and 0.10 g. of sodium sulphite are dissolved in distilled water until the volume is 100 ml. This solution is used to fill ampoules, each of preferably 2 ml. and containing 25 mg. of active substance. The ampoules are heat-sterilized in the usual way.

The active substance used in the above examples can be replaced, e.g. by the same amounts of 5-(γ-pyrrolidino-n-butyl)-iminodibenzyl hydrochloride or of a salt thereof with another of the acids given above.

We claim:

1. A method for the treatment of spastic conditions of smooth muscle structures in mammals, which comprises the administration to a mammal suffering therefrom of a smooth muscle spasm-relieving amount of a compound of the formula

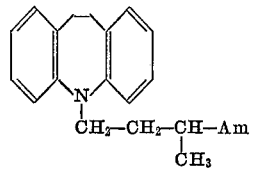

wherein Am represents dimethylamino or diethylamino or of a pharmaceutically acceptable salt of these compounds with an acid.

2. A composition in dosage unit form comprising a smooth-muscle spasm-relieving amount of a compound of the formula

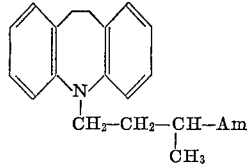

wherein Am represents dimethylamino or diethylamino or a pharmaceutically acceptable salt thereof with an acid in admixture with a pharmaceutical carrier therefor.

3. A composition as defined in claim 2, wherein said compound is 5-(γ-dimethylamino-n-butyl)-iminodibenzyl.

4. A composition as defined in claim 2, wherein said compound is 5-(γ-diethylamino-n-butyl)-iminodibenzyl.

References Cited

UNITED STATES PATENTS 2,554,736   5/1951   Haefliger et al. _____ 260—239

STANLEY J. FRIEDMAN, Primary Examiner